(12) United States Patent
Kim et al.

(10) Patent No.: US 11,505,258 B2
(45) Date of Patent: Nov. 22, 2022

(54) REAR VEHICLE BODY STRUCTURE

(71) Applicants: Hyundai Motor Company, Seoul (KR); Kia Motors Corporation, Seoul (KR)

(72) Inventors: Yeongjae Kim, Gyeonggi-do (KR); Won Ki Song, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/207,303

(22) Filed: Mar. 19, 2021

(65) Prior Publication Data

US 2022/0185381 A1 Jun. 16, 2022

(30) Foreign Application Priority Data

Dec. 15, 2020 (KR) .......... 10-2020-0175132

(51) Int. Cl.
| | | |
|---|---|---|
| *B60N 2/42* | (2006.01) | |
| *B60N 2/005* | (2006.01) | |
| *B62D 25/08* | (2006.01) | |
| *B62D 25/02* | (2006.01) | |
| *B62D 25/20* | (2006.01) | |
| *B62D 25/04* | (2006.01) | |
| *B60N 2/015* | (2006.01) | |
| *B62D 27/02* | (2006.01) | |

(52) U.S. Cl.
CPC .......... *B62D 25/08* (2013.01); *B60N 2/005* (2013.01); *B60N 2/015* (2013.01); *B60N 2/4263* (2013.01); *B62D 25/02* (2013.01); *B62D 25/04* (2013.01); *B62D 25/2027* (2013.01); *B62D 25/087* (2013.01); *B62D 27/023* (2013.01)

(58) Field of Classification Search
CPC ........ B62D 25/02; B62D 25/04; B62D 25/08; B62D 25/20; B62D 25/2009; B62D 25/2027; B62D 25/2036; B62D 27/023
USPC ....... 296/203.01, 203.03, 203.04, 193.08, 63
See application file for complete search history.

(56) References Cited

U.S. PATENT DOCUMENTS

| | | | | |
|---|---|---|---|---|
| 5,018,780 A * | 5/1991 | Yoshii | ............... | B62D 25/2027 296/30 |
| 7,063,368 B2 * | 6/2006 | Kayumi | ................... | B60N 2/36 296/65.05 |
| 8,191,961 B2 * | 6/2012 | Matsuoka | ............ | B62D 25/087 296/193.08 |
| 8,585,131 B2 * | 11/2013 | Rawlinson | ........... | B62D 25/087 296/187.11 |
| 10,093,176 B2 * | 10/2018 | Muramatsu | ............ | B62D 25/08 |
| 10,300,959 B2 * | 5/2019 | Kudoh | ............... | B62D 25/2027 |
| 10,710,644 B2 * | 7/2020 | Kim | ....................... | B62D 25/20 |
| 11,052,949 B2 * | 7/2021 | Yamada | ............... | B62D 25/087 |
| 11,091,205 B2 * | 8/2021 | Tsukamoto | ............ | B62D 21/08 |
| 11,173,965 B2 * | 11/2021 | Tsukamoto | ............ | B62D 21/09 |

(Continued)

FOREIGN PATENT DOCUMENTS

JP 6594228 B2 * 10/2019 ............... B60K 1/00

*Primary Examiner* — Dennis H Pedder
(74) *Attorney, Agent, or Firm* — Slater Matsil, LLP (57) ABSTRACT

An embodiment rear vehicle body structure of a vehicle including an underbody and an upper body coupled to the underbody includes a reinforcing member coupled to an upper surface of a rear floor panel provided on the rear side of the upper body and connected to both chassis frames of the underbody through the rear floor panel.

5 Claims, 8 Drawing Sheets

(56) References Cited

U.S. PATENT DOCUMENTS 11,192,586 B2 * 12/2021 Kubota ................... B60K 1/04
11,192,594 B2 * 12/2021 Ishimoto ................ B62D 21/11

* cited by examiner

REAR VEHICLE BODY STRUCTURE

CROSS-REFERENCE TO RELATED APPLICATIONS

This application claims priority to Korean Patent Application No. 10-2020-0175132, filed on Dec. 15, 2020, which application is hereby incorporated herein by reference.

TECHNICAL FIELD

An embodiment of the present invention relates to a vehicle body structure. More particularly, an embodiment of the present invention relates to a rear vehicle body structure of a purpose-built vehicle (PBV).

BACKGROUND

Recently, the vehicle industry has introduced a new concept of future mobility visions for realizing a human-centered dynamic future city. One of these future mobility solutions is a PBV (purpose-built vehicle) as purpose-based mobility.

The PBV is an environment-friendly mobility solution that provides customized services necessary for occupants during the time of moving to the destination by ground, and it may also perform setting of an optimal path and cluster driving for each situation using electric vehicle-based and artificial intelligence.

The vehicle body of a PBV is composed of an underbody (also referred to as a rolling chassis or a skateboard in the industry) and an upper body mounted on the underbody.

Here, the battery module is mounted on the underbody. In addition, the upper body may be a space frame composed of a skeleton by welding a steel plate or a pipe, and is mounted on the underbody through a cabin part.

The rear vehicle body structure of such a PBV mounts a rear seat at the wheel house side. Accordingly, conventionally, to prevent a submarine phenomenon, a floor panel vehicle body has to be disposed with an upward slope, but when the floor panel is disposed upward, it is difficult to configure the rear pillar and the rear side member, thereby making it difficult to implement the submarine phenomenon prevention vehicle body.

In addition, conventionally, the vehicle body skeleton strength and collision performance may be deteriorated due to insufficient bonding strength between the underbody and the upper body and damage to the battery module may be caused due to a rear collision.

The above information disclosed in this Background section is only for enhancement of understanding of the background of the invention, and therefore it may contain information that does not form the prior art that is already known in this country to a person of ordinary skill in the art.

SUMMARY

Embodiments of the present invention are to provide a rear vehicle body structure that increases the skeleton strength at the rear side of the vehicle body and increases the rear collision performance.

A rear vehicle body structure according to an embodiment of the present invention as a rear vehicle body structure of a vehicle including an underbody and an upper body coupled to the underbody may include a reinforcing member coupled to an upper surface of a rear floor panel provided on the rear side of the upper body and connected to both chassis frames of the underbody through the rear floor panel.

In the rear vehicle body structure according to an embodiment of the present invention, both ends of the reinforcing member may be connected to both rear quarter parts of the upper body.

In the rear vehicle body structure according to an embodiment of the present invention, both ends of the reinforcing member may be connected to a wheel house of the rear quarter part.

In the rear vehicle body structure according to an embodiment of the present invention, both ends of the reinforcing member may be connected to both rear pillars of the upper body.

In the rear vehicle body structure according to an embodiment of the present invention, a quarter reinforcement member may be coupled to the wheel house through both chassis frames in an up and down direction.

In the rear vehicle body structure according to an embodiment of the present invention, a rear seat may be mounted on the reinforcing member.

In the rear vehicle body structure according to an embodiment of the present invention, the reinforcing member may form a seat mounting surface of a mountain shape inclined toward the front and rear.

In the rear vehicle body structure according to an embodiment of the present invention, the reinforcing member may be overlapped with the rear side of both chassis frames in the up and down direction.

In the rear vehicle body structure according to an embodiment of the present invention, the reinforcing member, both rear pillars of the upper body, and both chassis frames of the underbody as an annular may be connected to the quarter reinforcement member through the wheel house.

In the rear vehicle body structure according to an embodiment of the present invention, the reinforcing member may include a first portion forming the seat mount surface of the rear side and overlapped with both chassis frames in the up and down direction; a second portion integrally connected to the first portion and forming the seat mount surface of the front side; and a third portion integrally connected to both sides of the second portion and coupled to both rear pillars of the upper body.

An embodiment of the present invention may increase the rear side skeleton strength of the underbody and the upper body and may improve the rear collision performance of the vehicle Further, effects that can be obtained or expected from embodiments of the present invention are directly or suggestively described in the following detailed description. That is, various effects expected from embodiments of the present invention will be described in the following detailed description.

BRIEF DESCRIPTION OF THE DRAWINGS

The drawings are provided for reference in describing embodiments of the present invention, and the spirit of the present invention should not to be construed only by the accompanying drawings.

DETAILED DESCRIPTION OF ILLUSTRATIVE EMBODIMENTS

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Components unrelated to the description will be omitted in order to obviously describe the present invention, and like reference numerals will be used to describe like components throughout the present specification.

The size and thickness of each configuration shown in the drawings are arbitrarily shown for better understanding and ease of description, but the present invention is not limited thereto, and the thickness of layers, films, panels, regions, etc., are exaggerated for clarity.

In the following detailed description, names of constituent elements which are in the same relationship are divided into "first", "second", and the like, but the present invention is not limited to the order in the following description.

In addition, unless explicitly described to the contrary, the word "comprise" and variations such as "comprises" or "comprising" will be understood to imply the inclusion of stated elements but not the exclusion of any other elements.

In addition, the terms " . . . unit", " . . . means", " . . . part", and " . . . member" described in the specification mean units of a general configuration performing at least one function or operation.

Figure 1:
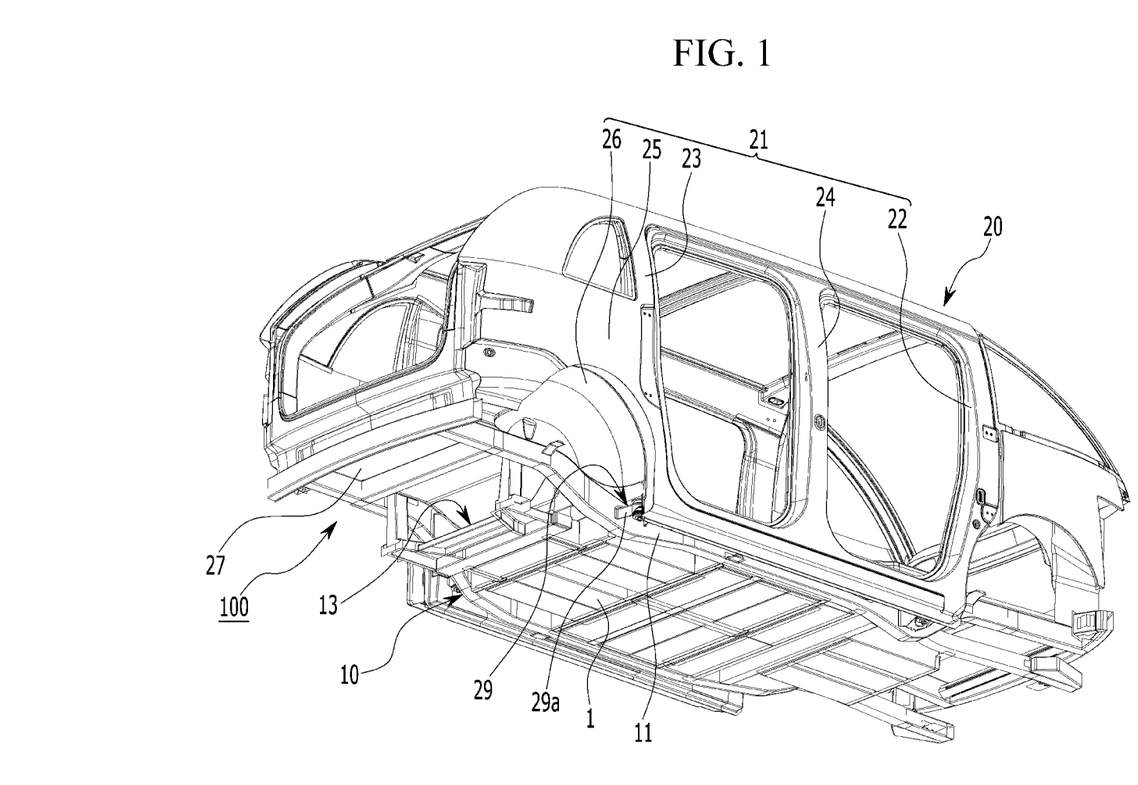
FIG. 1 is a view showing an example of a vehicle to which a rear vehicle body structure according to an embodiment of the present invention may be applied.

FIG. 1 is a view showing an example of a vehicle to which a rear vehicle body structure according to an embodiment of the present invention may be applied.

Referring to FIG. 1, an embodiment of the present invention may be applied a purpose-built vehicle (hereinafter, referring to as a PBV) for example.

The PBV is an electric vehicle-based environment-friendly mobile vehicle that provides customized services necessary to an occupant during a travel time to a destination on a ground. The PBV is capable of setting an optimal path and cluster driving for each situation, and may further be a box-type design vehicle with a large indoor space.

This PBV includes an underbody 10 (also referred to as a rolling chassis in the art) of a skateboard type and an upper body 20 mounted on the underbody 10.

A battery assembly 1 may be mounted on the underbody 10, and the underbody 10 forms a chassis frame 11 on both sides. Here, a drive motor (not shown in the drawing) may be installed on the rear side of both chassis frames 11. Accordingly, a motor mount part 13 for mounting a drive motor is provided on the rear side of the chassis frame 11.

The upper body 20 is a body coupled to the underbody 10, and constitutes a cabin in the center part between the front part and the rear part. For example, it may be a space frame composed of a skeleton by connecting steel plates or pipes.

The upper body 20 forms a side assembly 21 on both sides. The side assembly 21 is combined with both chassis frames 11 of the underbody 10. This side assembly 21 forms a front pillar 22 on the front part, forms a rear pillar 23 on the rear part, and forms a center pillar 24 between the front part and the rear part.

And, the side assembly 21 forms rear quarter parts 25 on both sides of the rear part. In addition, a wheel house 26 is formed in the rear quarter part 25. Furthermore, in the upper body 20, the rear floor panel 27 is installed between the rear quarter parts 25. The rear floor panel 27 is coupled to the rear side of the chassis frame 11.

In the industry, a vehicle width direction is referred to as an L direction, a vehicle body length direction (a front and rear direction of the vehicle body) is referred to as a T direction, and a height direction of the vehicle body is referred to as an H direction. However, in an embodiment of the present invention, instead of setting the LTH directions as described above as the reference directions, the constituent elements in the following are described by setting the vehicle width direction, the vehicle body length direction, and the vehicle height direction.

In addition, an end (one side end or the other side end) in the following may be defined as an end of any side and a certain portion (one side part or the other side end) including the end.

The rear vehicle body structure 100 according to an embodiment of the present invention has a structure capable of increasing the skeleton strength of the rear side of the vehicle body and increasing the rear collision performance of the vehicle body.

Figure 2:
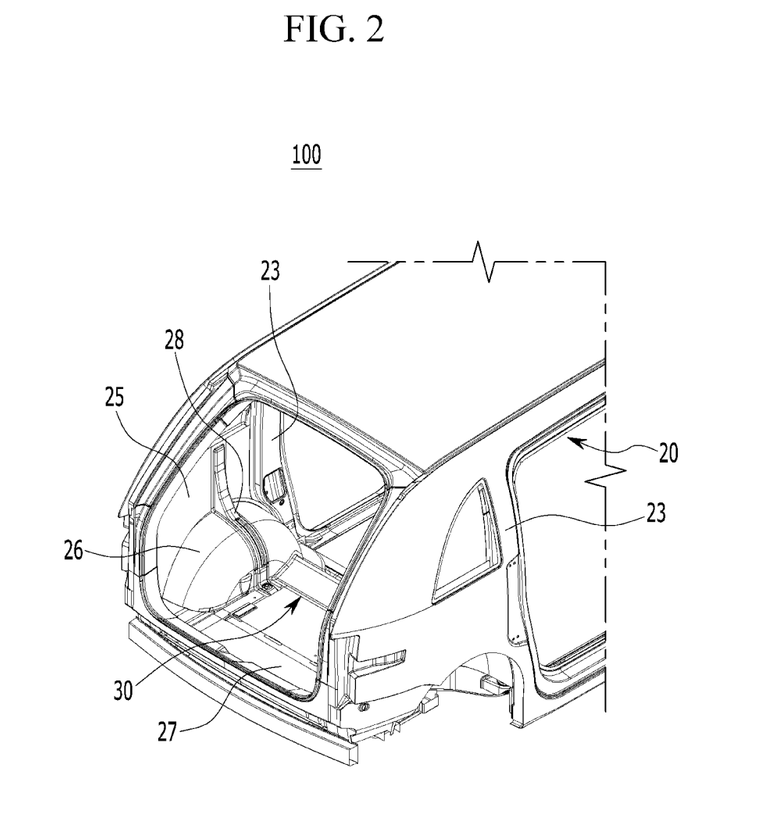
FIG. 2 to FIG. 4 are views showing a rear vehicle body structure according to an embodiment of the present invention, respectively.
Figure 3:
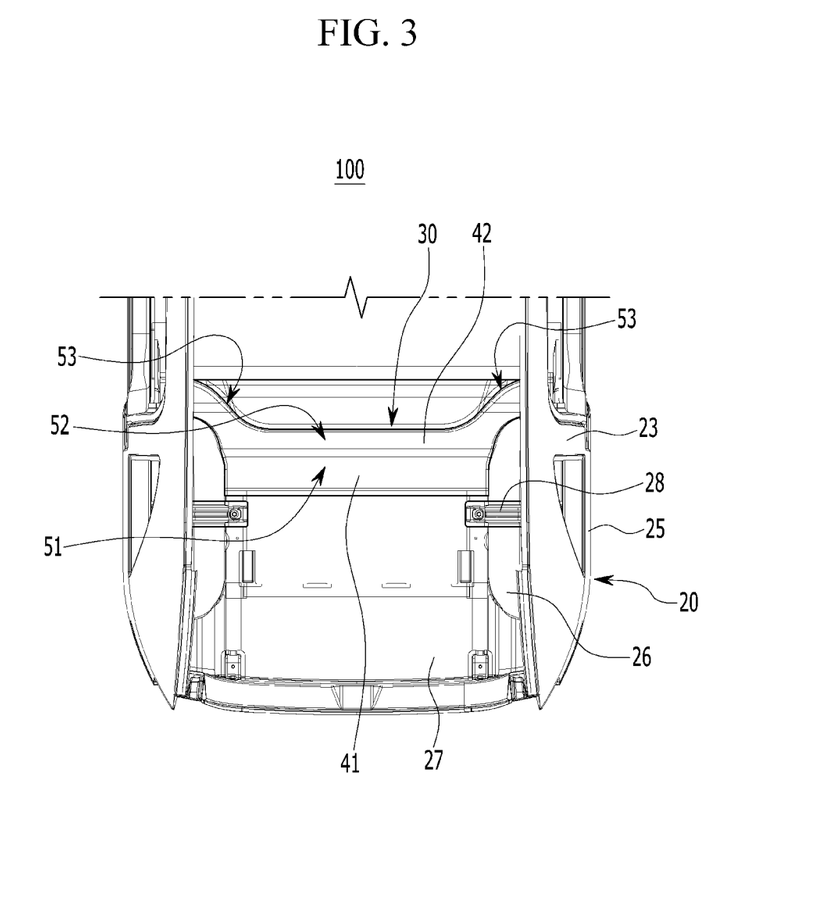
Figure 4:
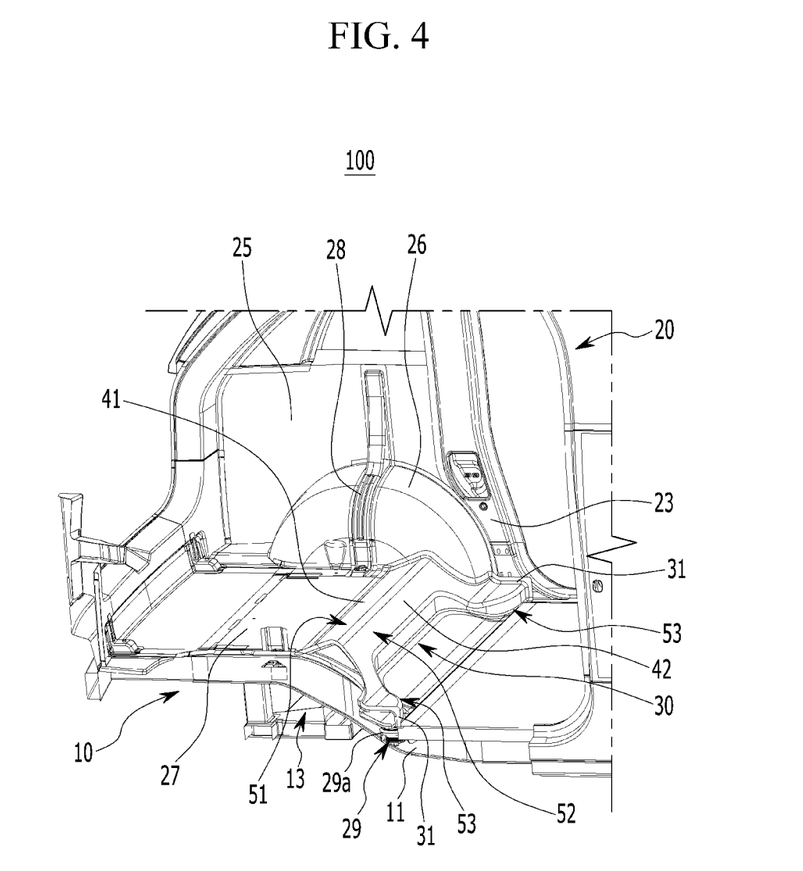
Figure 5:
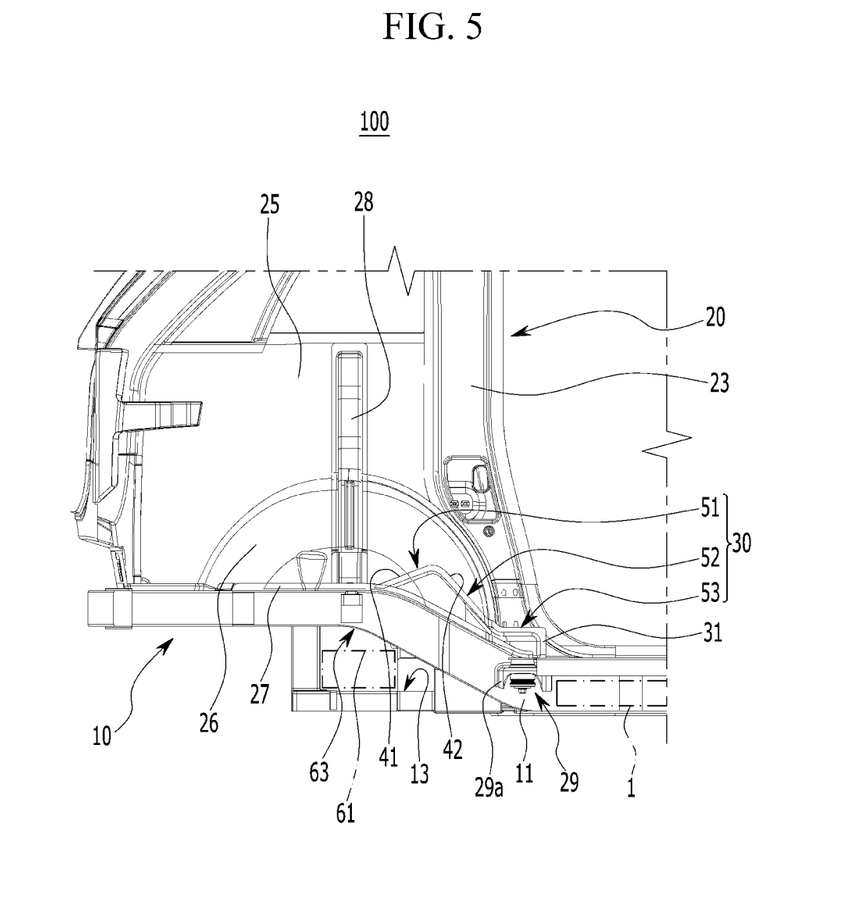
FIG. 5 to FIG. 8 are views showing a reinforcing member bonding structure applied to a rear vehicle body structure according to an embodiment of the present invention, respectively.
Figure 6:
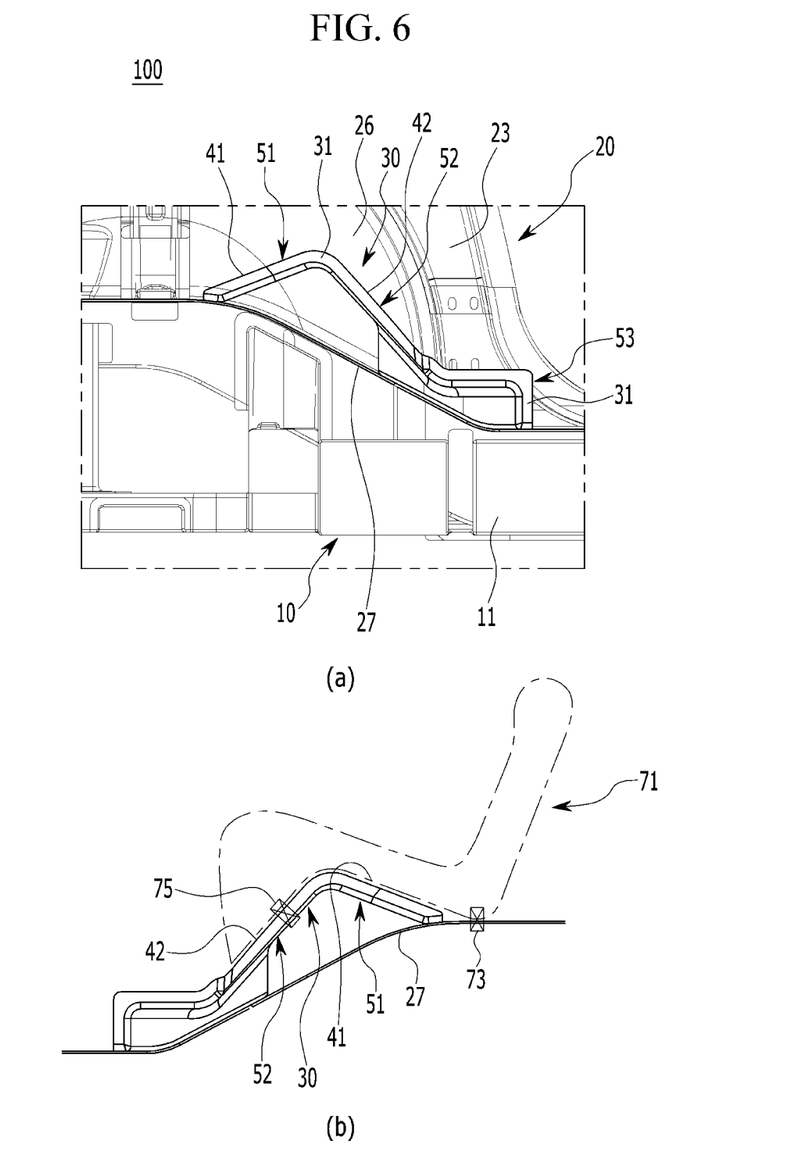
Figure 7:
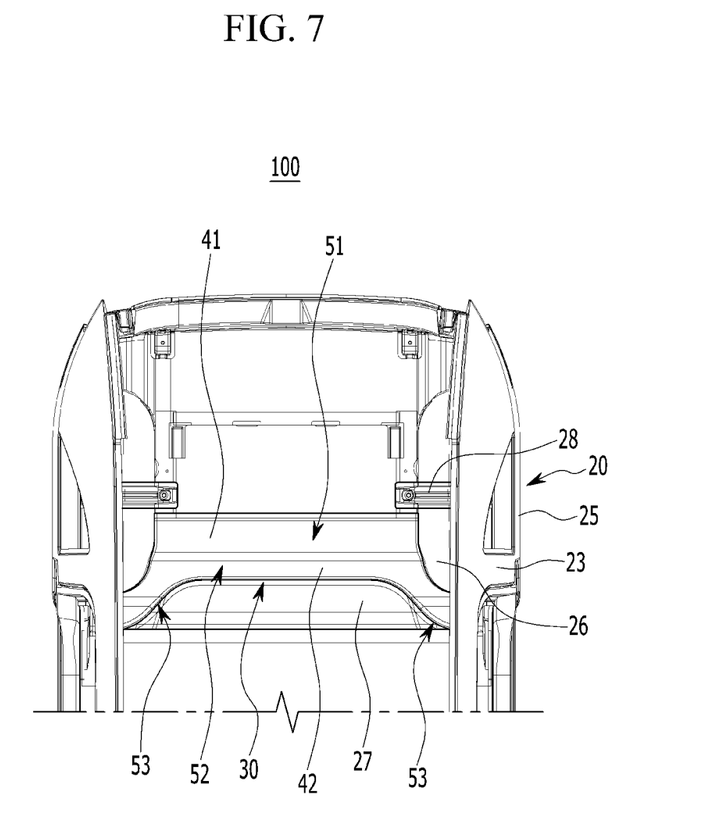

FIG. 2 to FIG. 4 are views showing a rear vehicle body structure according to an embodiment of the present invention, respectively.

Referring to FIG. 2 to FIG. 4, a rear vehicle body structure 100 according to an embodiment of the present invention basically includes a reinforcing member 30 provided on the rear side of the upper body 20.

In an embodiment of the present invention, the reinforcing member 30 is for increasing the rear side strength of the vehicle body and increasing the rear collision performance of the vehicle body. The reinforcing member 30 provided as a panel that is bent and molded into a predetermined shape.

The reinforcing member 30 is coupled to the upper surface of the rear floor panel 27 and is connected to both chassis frames 11 of the underbody 10 through the rear floor panel 27. In the following, both chassis frames 11 refer to the rear side parts of the chassis frame 11.

Meanwhile, the reinforcing member 30 as described above is connected to both chassis frames 11 of the underbody 10 through the rear floor panel 27, and the rear floor panel 27 is engaged with both chassis frames 11 through an engaging part 29.

The engaging part 29 may engage the chassis frame 11 and the rear floor panel 27 as a bolt and a nut through a mounting bracket 29a fixed to the chassis frame 11. In this case, the reinforcing member 30 is coupled to both sides of the rear floor panel 27 fixed to the chassis frame 11 through the engaging part 29.

Hereinafter, the configuration and bonding structure of the reinforcing member 30 are described in detail with reference to the accompanying drawings together with the drawings disclosed above.

FIG. 5 to FIG. 8 are views showing a reinforcing member bonding structure applied to a rear vehicle body structure according to an embodiment of the present invention, respectively.

Referring to FIG. 5 to FIG. 8, the reinforcing member 30 is bonded to both rear quarter parts 25 of the upper body 20 through both ends. The parts of both ends of the reinforcing member 30 are welded to the wheel house 26 of both rear quarter parts 25.

And, the reinforcing member 30 is coupled to both rear pillars 23 of the upper body 20 through both ends. The rest of both ends of the reinforcing member 30 are welded to the bottom of both rear pillars 23.

Here, the reinforcing member 30 is welded to the wheel house 26 and the rear pillar 23 through flanges 31 provided at both ends. In addition, in the wheel house 26 in the above, a quarter reinforcement member 28 is coupled in the up and down direction through both chassis frames 11 and the rear floor panel 27 of the underbody 10.

Meanwhile, the reinforcing member 30 as described above is installed to be overlapped with the upper surface of the chassis frame 11 in the up and down direction through the rear floor panel 27. That is, the reinforcing member 30 is overlapped in the up and down direction on the rear side of the chassis frame 11 on the motor mount part 13 mentioned above.

Accordingly, in an embodiment of the present invention, the reinforcing member 30 forms a rigid section 63 to protect a drive motor 61 mounted on the motor mount part 13 in the chassis frame 11.

On the other hand, a rear seat 71 is mounted on the reinforcing member 30 on the wheel house 26 side. In this way, to mount the rear seat 71 on the reinforcing member 30, the reinforcing member 30 forms seat mounting surfaces 41 and 42 of the shape of a mountain inclined toward the front and rear.

Specifically, the reinforcing member 30 includes a first portion 51, a second portion 52, and a third portion 53 that are integrally connected to each other.

The first portion 51 is a part that overlaps both chassis frames 11 in the up and down directions and forms the seat mounting surface 41 on the rear side. Both ends of the first portion 51 are coupled to the wheel house 26.

The second portion 52 is integrally connected to the first portion 51 and forms the seat mounting surface 42 on the front side. Both ends of the second portion 52 are coupled to the wheel house 26.

The third portion 53 is integrally connected to both sides of the second portion 52 and is coupled to the wheel house 26 and both rear pillars 23.

Here, the seat mounting surface 41 of the rear side supports the rear side of the rear seat 71, and the rear side of the rear seat 71 may be engaged with the rear floor panel 27 through a first mount member 73 such as a bolt.

And, the seat mounting surface 42 of the front side supports the front side of the rear seat 71, and the front side of the rear seat 71 may be engaged with the seat mounting surface 42 of the front side through a second mount member 75 such as a hook.

Figure 8:
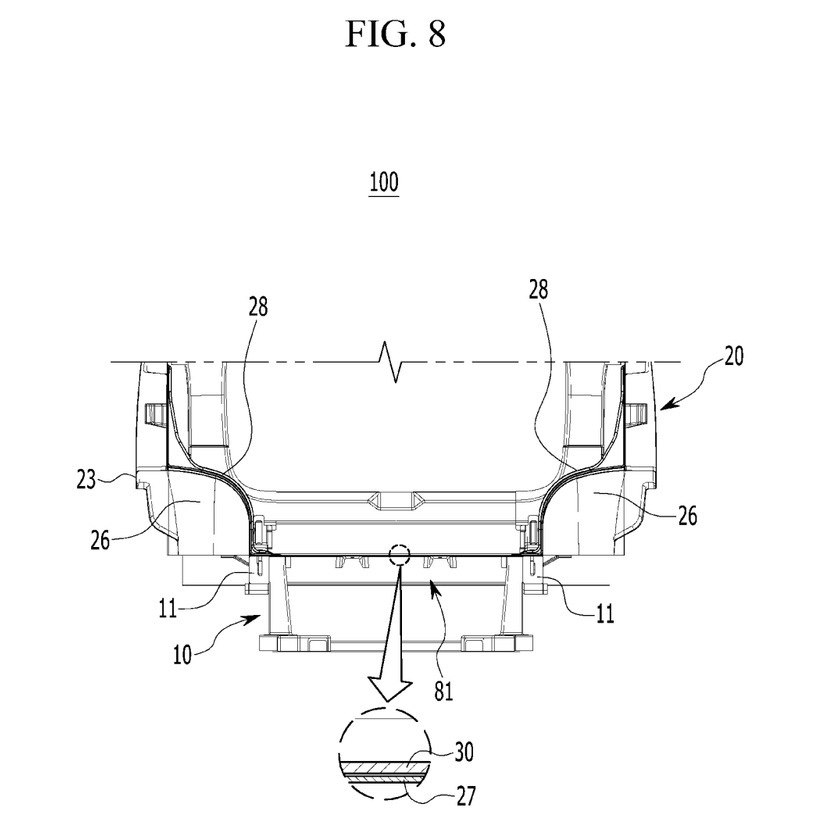

On the other hand, the reinforcing member 30 according to an embodiment of the present invention forms an annular structure 81 for increasing the strength of the rear side of the vehicle body (referring to FIG. 8).

The annular structure 81 has a structure in which the reinforcing member 30, both rear pillars 23, and both chassis frames 11 are annularly connected. This annular structure 81 may be connected to the quarter reinforcement member 28 mentioned above through the wheel house 26.

Hereinafter, the operation effects of the rear vehicle body structure 100 according to an embodiment of the present invention configured as described above is described in detail with reference to the drawings disclosed above.

First, an embodiment of the present invention mounts the reinforcing member 30 coupled to the upper surface of the rear floor panel 27 on the rear side of the upper body 20 and connected to the both chassis frame 11 of the underbody 10 thorough the rear floor panel 27.

Here, both ends of the reinforcing member 30 are coupled to the wheel house 26 of the rear quarter part 25 and both rear pillar 23, where the quarter reinforcement member 28 is coupled in up and down direction. Furthermore, the reinforcing member 30 is installed to be overlapped in the up and down direction on the rear side of the chassis frame 11 on the motor mount part 13.

Accordingly, the reinforcing member 30 forms the rigid section 63 on the rear side of the chassis frame 11 to protect the drive motor 61 mounted on the motor mount part 13 in the chassis frame 11.

Accordingly, in an embodiment of the present invention, the battery assembly 1 may be prevented from being damaged while the drive motor 61 mounted on motor mount part 13 enters the mount space of the battery assembly 1 during the rear collision of the vehicle.

In addition, in an embodiment of the present invention, the reinforcing member 30, both rear pillar 23 and both chassis frame 11 as the annular form the annular structure 81 that is connected to the quarter reinforcement member 28 through the wheel house 26.

Thus, in an embodiment of the present invention, the chassis frame 11 and both rear pillar 23 are connected through the reinforcing member 30 and as a road path leading to the quarter reinforcement member 28 of the wheel house 26 is formed, thereby increasing input point strength of the reinforcing member 30 and the strength behind the vehicle body.

Furthermore, in an embodiment of the present invention, the reinforcing member 30 serves as a seat crossmember for mounting the rear seat 71, and the rear seat 71 may be mounted on the seat mounting surfaces 41 and 42 in the form of a mountain inclined toward the front and rear of the reinforcing member 30.

Therefore, in an embodiment of the present invention, by mounting the rear seat 71 on the reinforcing member 30, the occupant moves downward when the vehicle is collided in the front of the vehicle, thereby preventing a submarine phenomenon in which injuries such as a rupture of the intestines occur.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

1: battery assembly
10: underbody
11: chassis frame
13: motor mount part
20: upper body
21: side assembly
22: front pillar
23: rear pillar
24: center pillar
25: rear quarter part
26: wheel house
27: rear floor panel
28: quarter reinforcement member
29: engaging part
29a: mounting bracket
30: reinforcing member 31: flange
41, 42: seat mounting surface
51, 52, 53: first, second and third portion
61: drive motor
63: rigid section 71: rear seat
73, 75: first, and second mount member
81: annular structure
100: rear vehicle body structure While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rear vehicle body structure of a vehicle including an underbody having two chassis frames, and an upper body coupled to the underbody, the rear vehicle body structure comprising:

a reinforcing member coupled to an upper surface of a rear floor panel positioned on a rear side of the upper body, and connected to both chassis frames of the underbody through the rear floor panel;

wherein each end of the reinforcing member is directly connected to a respective wheel house of a respective rear quarter part of the upper body;

wherein the reinforcing member is overlapped with a rear side of both chassis frames over a motor mount part; and wherein the reinforcing member forms a seat mounting surface having a mountain shape inclined toward a front side and a rear side of the reinforcing member; and a rear seat mounted on the seat mounting surface, on both the front and rear sides of the reinforcing member.

2. The rear vehicle body structure of claim 1, wherein each end of the reinforcing member is connected to a respective rear pillar of the upper body.

3. The rear vehicle body structure of claim 1, wherein each of two quarter reinforcement members is coupled to the respective wheel house through a respective chassis frame.

4. The rear vehicle body structure of claim 3, wherein the reinforcing member, both rear pillars of the upper body, and both chassis frames of the underbody form a structure that is connected to each quarter reinforcement member through the respective wheel house.

5. The rear vehicle body structure of claim 1, wherein the reinforcing member includes:

a first portion forming the seat mounting surface of the rear side and overlapped with both chassis frames;

a second portion integrally connected to the first portion and forming the seat mounting surface of the front side; and a third portion integrally connected to both sides of the second portion and coupled to both rear pillars of the upper body.

* * * * *